United States Patent
Shiroshima

(10) Patent No.: US 9,882,682 B2
(45) Date of Patent: Jan. 30, 2018

(54) MESSAGE DISTRIBUTING SYSTEM, MESSAGE DISTRIBUTING APPARATUS, MESSAGE DISTRIBUTING METHOD AND MESSAGE DISTRIBUTING PROGRAM

(71) Applicant: NEC Corporation, Minato-ku, Tokyo (JP)

(72) Inventor: Takahiro Shiroshima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 68 days.

(21) Appl. No.: 14/900,712

(22) PCT Filed: Jun. 20, 2014

(86) PCT No.: PCT/JP2014/003325
§ 371 (c)(1),
(2) Date: Dec. 22, 2015

(87) PCT Pub. No.: WO2015/004861
PCT Pub. Date: Jan. 15, 2015

(65) Prior Publication Data
US 2016/0149673 A1 May 26, 2016

(30) Foreign Application Priority Data

Jul. 10, 2013 (JP) .................................. 2013-144817

(51) Int. Cl.
*H04W 76/04* (2009.01)
*H04L 1/18* (2006.01)
*H04W 52/02* (2009.01)

(52) U.S. Cl.
CPC ............ *H04L 1/1887* (2013.01); *H04L 1/188* (2013.01); *H04W 52/0225* (2013.01); *H04W 76/046* (2013.01); *Y02B 60/50* (2013.01)

(58) Field of Classification Search
CPC .. H04L 1/1887; H04L 1/188; H04W 52/0225; H04W 76/046; Y02B 60/50
See application file for complete search history.

(56) References Cited

U.S. PATENT DOCUMENTS 7,180,871 B1* 2/2007 Khaflzov ............ H04L 43/0852
370/252
2013/0301504 A1* 11/2013 Lenart ............... H04W 52/0225
370/311

FOREIGN PATENT DOCUMENTS

JP  2005-5906 A   1/2005
JP  2006-229955 A  8/2006
(Continued)

OTHER PUBLICATIONS

Universal Mobile Telecommunications System; Radio Resource Control protocol specification, ETSI TS 125 331 V6.8.0 , Dec. 2005.
(Continued)

*Primary Examiner* — Thai Nguyen

(57) ABSTRACT

A message distributing system of the present invention includes: a mobile terminal; a service server which distributes a message to the mobile terminal; a message distributing apparatus which repeats the message and a request for distribution of the message that are provided by the service server; and a network apparatus which transmits the message, that is provided by the message distributing apparatus; to the mobile terminal. The message distributing apparatus sets a retransmission control time; which is used for controlling a time of retransmission of the message, on the basis of the request for distribution, and controls the time of retransmission to the network apparatus on the basis of the retransmission control time. According to the present invention, it is possible to solve a problem that a retransmission packet is transmitted while a packet is not lost and conse-
(Continued)

| RRC STATE | TRANSITION DELAY TIME |
|---|---|
| CELL_DCH | 100 MILLISECONDS |
| CELL_FACH | 300 MILLISECONDS |
| CELL_PCH | 2 SECONDS |
| UTRA_Idle | 3 SECONDS |
| RRC CONNECTED | 50 MILLISECONDS |
| RRC IDLE | 500 MILLISECONDS | quently a load of network becomes heavy, and a problem that a retransmission packet is not transmitted while a packet is lost and consequently an arrival of a push message becomes delayed.

11 Claims, 7 Drawing Sheets

(56) References Cited

FOREIGN PATENT DOCUMENTS

| | | |
|---|---|---|
| JP | 2010-206807 A | 9/2010 |
| WO | 2014/109102 A1 | 7/2014 |

OTHER PUBLICATIONS

LTE; Evolved Universal Terrestrial Radio Access; Radio Resource Control: protocol specification, ETSI TS 136 331 V10.7.0, Nov. 2012.
V. Paxson et al; Internet Engineering Task Force; Request for Comments: 6298; ISSN: 2070-1721, Jun. 2011.
International Search Report for PCT Application No. PCT/JP2014/003325, dated Sep. 22, 2014.
English translation of Written opinion for PCT Application No. PCT/JP2014/003325.

\* cited by examiner

Fig. 6

| RRC STATE | TRANSITION DELAY TIME |
|---|---|
| CELL_DCH | 100 MILLISECONDS |
| CELL_FACH | 300 MILLISECONDS |
| CELL_PCH | 2 SECONDS |
| UTRA_Idle | 3 SECONDS |
| RRC_CONNECTED | 50 MILLISECONDS |
| RRC_IDLE | 500 MILLISECONDS |

MESSAGE DISTRIBUTING SYSTEM, MESSAGE DISTRIBUTING APPARATUS, MESSAGE DISTRIBUTING METHOD AND MESSAGE DISTRIBUTING PROGRAM

This application is a National Stage Entry of PCT/JP2014/003325 filed on, Jun. 20, 2014 which claims priority from Japanese Patent Application 2013-144817 filed on, Jul. 10, 2013 the contents of all of which are incorporated herein by reference, in their entirety.

TECHNICAL FIELD

The present invention relates to a message distributing system which, when distributing a push message to a mobile terminal, can carry out message distribution according to a state of acquisition of radio resources of a terminal on a radio network.

BACKGROUND ART

Recently, it becomes prevailing rapidly to use the Internet while a user moves. As a result, number of mobile terminals, which can deal with high speed packet communication, out of the cellular phone, the smartphone or the like increases. As a standard to realize the high speed packet communication, W-CDMA (Wideband Code Division Multiple Access), HSPA (High Speed Packet Access), LTE (Long Term Evolution) and the like have been proposed, and each mobile terminal uses the above-mentioned standard. However, by using the high speed packet communication, electric power consumption of the mobile terminal becomes increasing. As a result, in the case of a mobile terminal which works with a battery, a user's available time at a time when the user goes out becomes decreasing.

Then, according to PTL 1 (Patent Literature 1), a RRC (Radio Resource Control) state is set in a radio device of the mobile terminal. By setting the RRC state, the mobile terminal transits to a state in which high speed communication can be carried out only when packets are received frequently, and consequently it is possible for the mobile terminal to receive data instantaneously while electric power consumption is large instantaneously. Furthermore, when the mobile terminal does not receive any packets for a predetermined period of time, the mobile terminal transits to a suspension state from a low speed communication state by setting the RRC state. As a result, it is possible to suppress the electric power consumption. PTL 1 discloses the above-mentioned method for controlling the RRC state.

According to NPL (Non Patent Literature) 1 and NPL 2, in order to express the RRC state which is set at a time when receiving the packet, CELL_DCH (Dedicated Carrier Channel) is assigned to a high speed communicable state, and CELL_FACH (Forward Access Channel) is assigned to a low speed communicable state, and CELL_PCH (Paging Channel) and UTRA_Idle (Idle) are assigned to a suspension state, in the case of W-CDMA (HSPA). Moreover, in the case of LTE, RRC CONNECTED (connected state, CONN) is assigned to a communicable state, and RRC IDLE (idle, RRC idle) is assigned to a suspension state. Battery's electric power consumption of DCH, FACH, PCH and Idle becomes small in this order in the case of W-CDMA (HSPA), and battery's electric power consumption of CONN and RRC IDLE becomes small in this order in the case of LTE. Here, a radio transmission method is selected out of LTE and W-CDMA (HSPA) according to a radio network with which the mobile terminal is connected.

Moreover, in order that the mobile terminal, which is in the suspension state, may resume receiving data, it is necessary that the mobile terminal transits to the high speed communicable state or the low speed communicable state. In order that the RRC state may transit, it is necessary to carry out a negotiation between a network apparatus and the mobile terminal which are included in a radio network. A delay time in the RRC state transition amounts to several hundred milliseconds in the case of LTE, and about 2 to 5 seconds in the case of W-CDMA. As mentioned above, the mobile terminal in the communicable state transits to the low speed communication state or the suspension state if the mobile terminal does not receive any packets for the predetermined period of time. The predetermined period of time (inactivity timer) is specified in the radio network or the mobile terminal in advance.

Moreover, push type communication, which is used in order that a service provider on the Internet may distribute any message at any point of time to the mobile terminal, has started. In WWW (World Wide Web) which is used in the Internet, pull type communication, in which the mobile terminal starts communication with a WWW server on the Internet, is used. The push type communication is different from the pull type communication in a point that a service server, which the service provider holds, starts communication with the mobile terminal. While the push type communication is independently implemented in each application which provides a service, a general-purpose base for providing the push service is being recently built from a view point of efficient utilization of the network.

According to the base for the push service, a push server or a server which is called the push proxy gateway is arranged in a network of a push provider. Then, the push server or the push proxy gateway server receives a push request including a message (push message), which the service provider wants to push, from the service provider. Then, the push server identifies a mobile terminal, which is included in the push request, as a destination terminal, and distributes the push message to the mobile terminal by packet communication through the radio network. When carrying out the packet communication with the mobile terminal at a time of distribution, it is necessary to make the RRC state of the mobile terminal enter into the communicable state.

As a method of communication between the mobile terminal and the push server, TCP (Transmission Control Protocol)/IP (Internet Protocol) protocol is used in general. FIG. 1 shows a connection activating sequence according to the TCP/IP protocol. According to the TCP/IP protocol, a connection source apparatus, which activates the connection, transmits the SYN packet to a connection destination apparatus, and the connection destination apparatus replies the SYN+ACK packet to the connection source apparatus, and the connection source apparatus replies the ACK packet to the connection destination apparatus. As a result, the 3 way handshake for establishing the connection is carried out.

As a method which uses the TCP/IP protocol between the mobile terminal and the push server, two methods can be conceived. One is a method (keep alive method) in which the mobile terminal activates the TCP/IP connection with the push server, and the connection is maintained. The other is a method (direct connection method) in which the push server activates the TCP/IP connection with the mobile terminal every time when distributing the push message.

According to the keep alive method, the push server can communicate with the mobile terminal even in the case that NAT (Network Address Translation) or a proxy exists between the mobile terminal and the push server. On the other hand, according to the direct connection method, the push server can not recognize an IP address which identifies the mobile terminal, and consequently cannot communicate with the mobile terminal. However, in the case of the keep alive method, it is necessary to always maintain the TCP/IP connection between the mobile terminal and the push server, and consequently a load to be processed becomes heavy. On the other hand, in the case of the direct connection method, the TCP/IP connection is carried out only for a short period of time which is necessary for carrying out the push distribution. As a result, the load to be processed becomes light.

According to the TCP/IP protocol, when a packet transmission source transmits a packet, a timer which is called RTO (Retransmission Time Out) is worked. In the case that the ACK packet, which indicates that a packet transmission destination normally receives the packet, is not replied by the packet transmission destination within a period of time designated by the timer, the packet transmission source judges that the packet is lost during transferring, and then the packet transmission source retransmits the same packet. RTO has a value which is defined each time when the TCP/IP connection process is carried out. In NPL 3, an initial value of RTO is calculated according to the following Formula 1.

$$RTO = 1 \text{ second} (=3 \text{ seconds if arrival of } SYN+ACK \text{ packet is delayed}) \quad \text{(Formula 1)}$$

When firstly receiving the ACK packet in the TCP/IP connection process, RTO is calculated according to the following Formula 2.

$$RTO = RTT + K \times RTT/2 \quad \text{(Formula 2)}$$

Here, RTT is a round trip time which is defined as a time from the packet transmission source's transmitting the packet until the packet transmission source's receiving the ACK packet corresponding to the packet. Moreover, each time when the round trip time is calculated afterward, RTO is calculated according to the following Formula 3.

$$RTO = SRTT + K \times RTTVAR(K=4) \quad \text{(Formula 3)}$$

where SRTT is an average of the round trip times of the past packets, and RTTVAR is an average variation of the round trip time. In the case that the ACK packet corresponding to the transmitted packet is not replied during RTO, the transmitted packet is retransmitted, and the back-off algorithm makes the value of RTO two times as long as the current value, and then the packet transmission source waits for the ACK packet's arriving.

In the case of a network whose delay time varies severely, the round trip time, which is measured at a time when the delay time is short, becomes short. As a result, the value of RTO becomes small. Afterward, when the transmission delay time changes rapidly so as to have a large value, RTO which has the small value causes frequent retransmission of the packet. According to PTL 2, in the case that a transmission terminal transmits a packet with frequency which is higher than predetermined frequency, a receiving side terminal does not reply the ACK packet instantaneously and replies the ACK packet after an elapse of short time. As a result, RTT becomes long. That is, by making RTO of the transmission side long always, it is possible to make number of re-transfers of the packet, which is caused by an expiration of RTO, small.

CITATION LIST

Patent Literature

[PTL 1] Japanese Patent Application Laid-Open Publication No. 2010-206807

[PTL 2] Japanese Patent Application Laid-Open Publication No. 2006-229955

Non Patent Literature

[NPL 1] 3GPP TS 25.331: Radio Resource Control (RRC); Protocol specification
[NPL 2] 3GPP TS 36.331: Evolved Universal Terrestrial Radio Access (E-UTRA); Radio Resource Control (RRC); Protocol specification
[NPL 3] Internet Engineering Task Force (IETF) Request for Comment: 6298

SUMMARY OF INVENTION

Technical Problem

In the case that the keep alive method is applied between the above-mentioned push serve and a mobile terminal to which the push server sends the push message, the mobile terminal activates the TCP/IP connection with the push server. A problem which is caused in this situation will be explained in the following with reference to FIG. 2.

In the case that the RRC state of the mobile terminal is the communicable state, the delay in the RRC state transition is not caused, and then the SYN packet, the SYN+ACK packet and the ACK packet reach respective destinations with a communication delay time of several milliseconds (here, assumed as 50 milliseconds). In this case, RTO of the push server which is the connection destination is expressed as the following according to Formula 2 since RTT which is the period of time from the push server's transmitting the SYN+ACK packet until the push server's receiving the ACK packet is 100 milliseconds.

$$RTO = 100 + 4 \times 100/2 = 300 \text{ milliseconds.}$$

In the case that the push server has no push message which should be distributed to the mobile terminal, a time passes with maintaining the TCP/IP connection.

When the service server requests the push server to distribute the push message after a certain time passes, the push server transmits the push message to the mobile terminal in a form of a push packet through the above-mentioned TCP/IP connection. At this time, in the case that the mobile terminal does not communicate for the period of time which is designated by the inactivity timer, the RRC state of the mobile terminal transits to the suspension state. The delay time in the RRC state transition until the mobile terminal transits to the communicable state amounts to several seconds (here, assumed as 4 seconds). Accordingly, it is impossible for the push server to receive the ACK packet even when the calculated time of RTT has elapsed, and consequently the push server retransmits the push message.

Afterward, when the back-off algorithm sets RTO to 2400 milliseconds, the push server can receive the ACK packet. After all, including the first packet, the push server transmits the same push message four times until the push server receives the ACK packet. Furthermore, since the transmitted four push messages reach the mobile terminal after the mobile terminal transits to the communicable state, the mobile terminal replies the ACK message four times to make a useless network load.

Next, a problem which is caused in the case that the direct connection method is applied between the push server and the mobile terminal will be explained with reference to FIG. 3. In this case, the push server activates the TCP/IP connection with the mobile terminal. But, in the case that the RRC state of the mobile terminal is the suspension state at this time, the delay in the RRC state transition (here, assumed as 4 seconds) is caused, and arrival of the SYN packet is delayed until the RRC state transits to the communicable state. At this time, RTO of the mobile terminal which is the connection source is expressed as the following by use of the supplement of Formula 1 (corresponding to 'if arrival of SYN+ACK packet is delayed' in Formula 1)

RTO=3 seconds

When the push server transmits a push message afterward and the message is lost due to a failure in radio or the like, it would be judged after an elapse of 300 milliseconds that the packet is lost since the mobile terminal is in the communication state, if the operation is normal. Therefore, while the push server can transmit the packet, the push server has to wait for an elapse of 3 seconds to retransmit the packet. Accordingly, an arrival of the push message at the mobile terminal is delayed.

According to the method described in PTL 2, a problem which depends on a time for delaying the transmission of the ACK packet is caused. That is, if the delay time is about several-hundred milliseconds, a problem that a plurality of retransmission packets are transmitted is caused, and if the delay time is long such as several seconds, a problem that an arrival of the push message is delayed is caused.

The present invention is conceived in consideration of the above-mentioned problems. An object of the present invention is to solve the problem that, when distributing the push message to the mobile terminal, the push server transmits the retransmission packet while the packet is not lost and consequently makes the network load heavy, and the problem that the push server does not transmit the retransmission packet while the packet is lost and consequently makes the arrival of the push message delayed.

Solution to Problem

A message distributing system of the present invention includes: a mobile terminal; a service server which distributes a message to the mobile terminal; a message distributing apparatus which repeats the message and a request for distribution of the message that are provided by the service server; and a network apparatus which transmits the message, that is provided by the message distributing apparatus, to the mobile terminal. The message distributing apparatus sets a retransmission control time, which is used for controlling a time of retransmission of the message, on the basis of the request for distribution, and controls the time of retransmission to the network apparatus on the basis of the retransmission control time.

A message distributing apparatus of the present invention includes: a terminal state specifying means which specifies a RRC state, that indicates whether it is possible to communicate with a mobile terminal, on the basis of a request for distribution of a message to the mobile terminal; a transition time estimating means which estimates a transition delay time, that is caused in the case of carrying out communication with the mobile terminal, on the basis of the RRC state; and a server side communication means which sets a retransmission control time, that is used for controlling a time of retransmission of the message, on the basis of the transition delay time, and controls the time of retransmission on the basis of the retransmission control time.

A message distributing method of the present invention includes: specifying a RRC state, which indicates whether it is possible to communicate with a mobile terminal, on the basis of a request for distribution of a message to the mobile terminal; estimating a transition delay time, which is caused in the case of carrying out communication with the mobile terminal, on the basis of the RRC state; setting a retransmission control time, which is used for controlling a time of retransmission of the message, on the basis of the transition delay time; and controlling the time of retransmission on the basis of the retransmission control time.

A message distributing program of the present invention makes a computer execute: a process of specifying a RRC state, which indicates whether it is possible to communicate with a mobile terminal, on the basis of a request for distribution of a message to the mobile terminal; a process of estimating a transition delay time, which is caused in the case of carrying out communication with the mobile terminal, on the basis of the RRC state; and a process of setting a retransmission control time, which is used for controlling a time of retransmission of the message, on the basis of the transition delay time, and controlling the time of retransmission on the basis of the retransmission control time.

Advantageous Effects of Invention

According to the present invention, it is possible to solve the problem that, when distributing the push message to the mobile terminal, the push server transmits the retransmission packet while the packet is not lost and consequently makes the network load heavy, and the problem that the push server does not transmit the retransmission packet while the packet is lost and consequently makes the arrival of the push message delayed.

BRIEF DESCRIPTION OF DRAWINGS

FIG. 6 is a diagram showing an example of a RRC state and a delay time corresponding to the RRC state which are managed by a transition time estimating means of a message distributing apparatus of the exemplary embodiment of the present invention.

DESCRIPTION OF EMBODIMENTS

Hereinafter, an exemplary embodiment of the present invention will be explained with reference to drawings. While the exemplary embodiment mentioned later includes a preferable limitation from a technical point of view in order to realize the present invention, the limitation does not limit the scope of the present invention.

Figure 7:
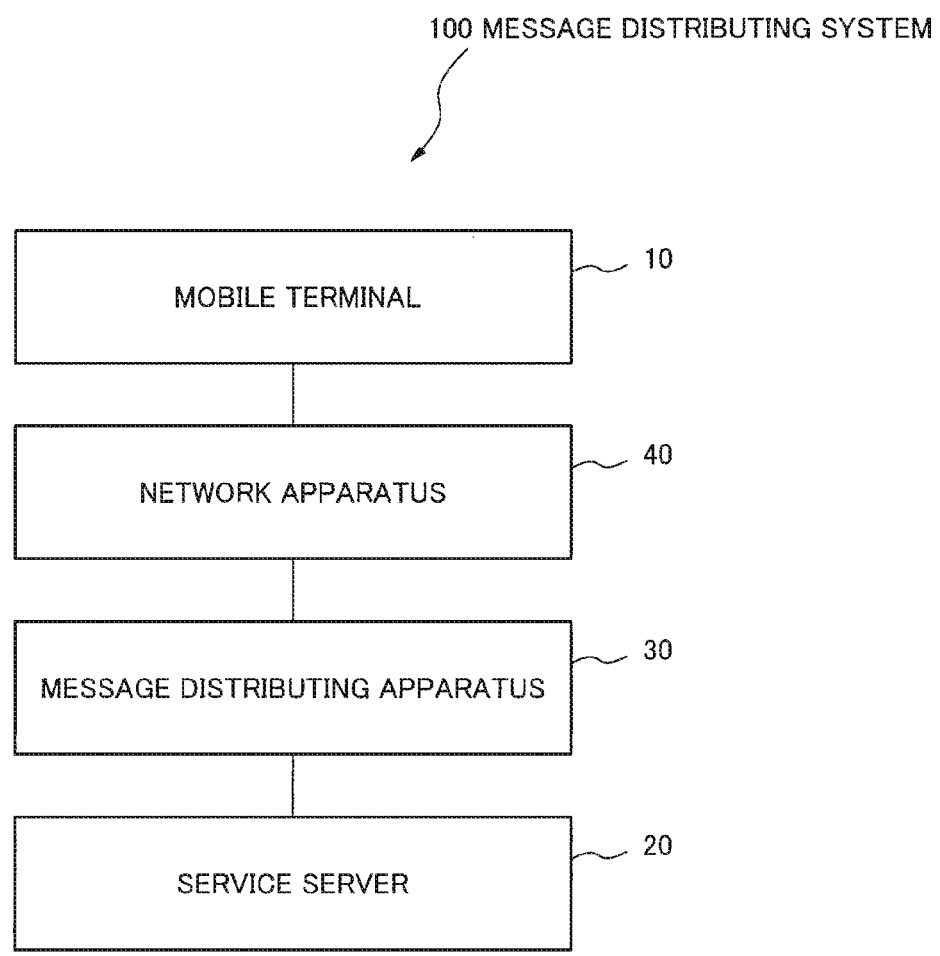
FIG. 7 is a block diagram showing a configuration of the message distributing system of the exemplary embodiment of the present invention.

FIG. 7 is a block diagram showing a configuration of a message distributing system of the exemplary embodiment of the present invention. The message distributing system 100 of the present exemplary embodiment includes a mobile terminal 10 and a service server 20 which distributes a message to the mobile terminal 10. Furthermore, the message distributing system 100 includes a message distributing apparatus 30 which repeats the message and a request for distribution of the message that are provided by the service server 20 and a network apparatus 40 which transmits the message, which is provided by the message distributing apparatus 30, to the mobile terminal. Furthermore, the message distributing apparatus 30 sets a retransmission control time, which is used for controlling a time of retransmission of the message, on the basis of the request for distribution, and controls the time of retransmission to the network apparatus 40 on the basis of the retransmission control time.

Figure 1:
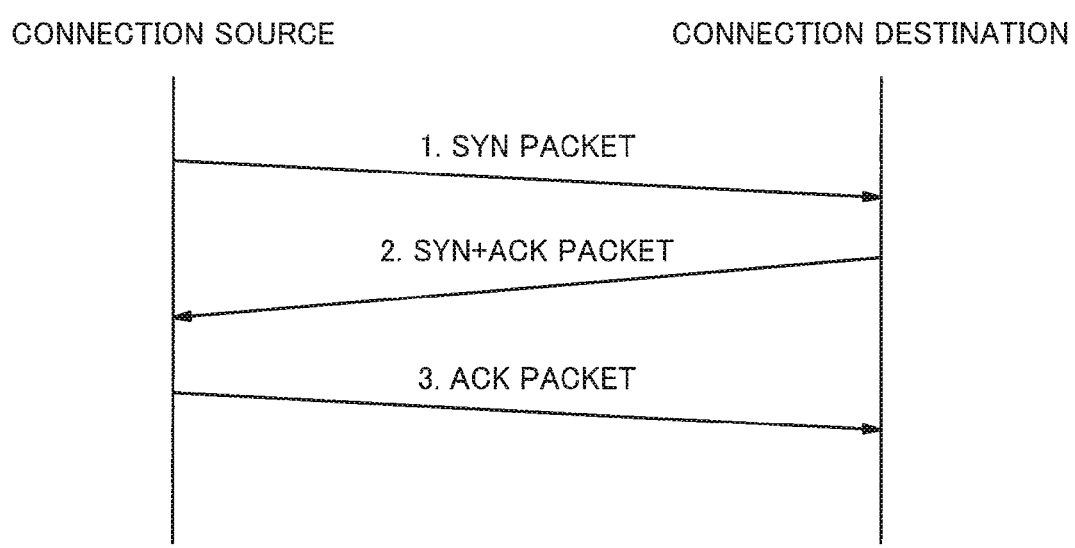
FIG. 1 is a diagram explaining a connection activating sequence according to the TCP/IP protocol.
Figure 2:
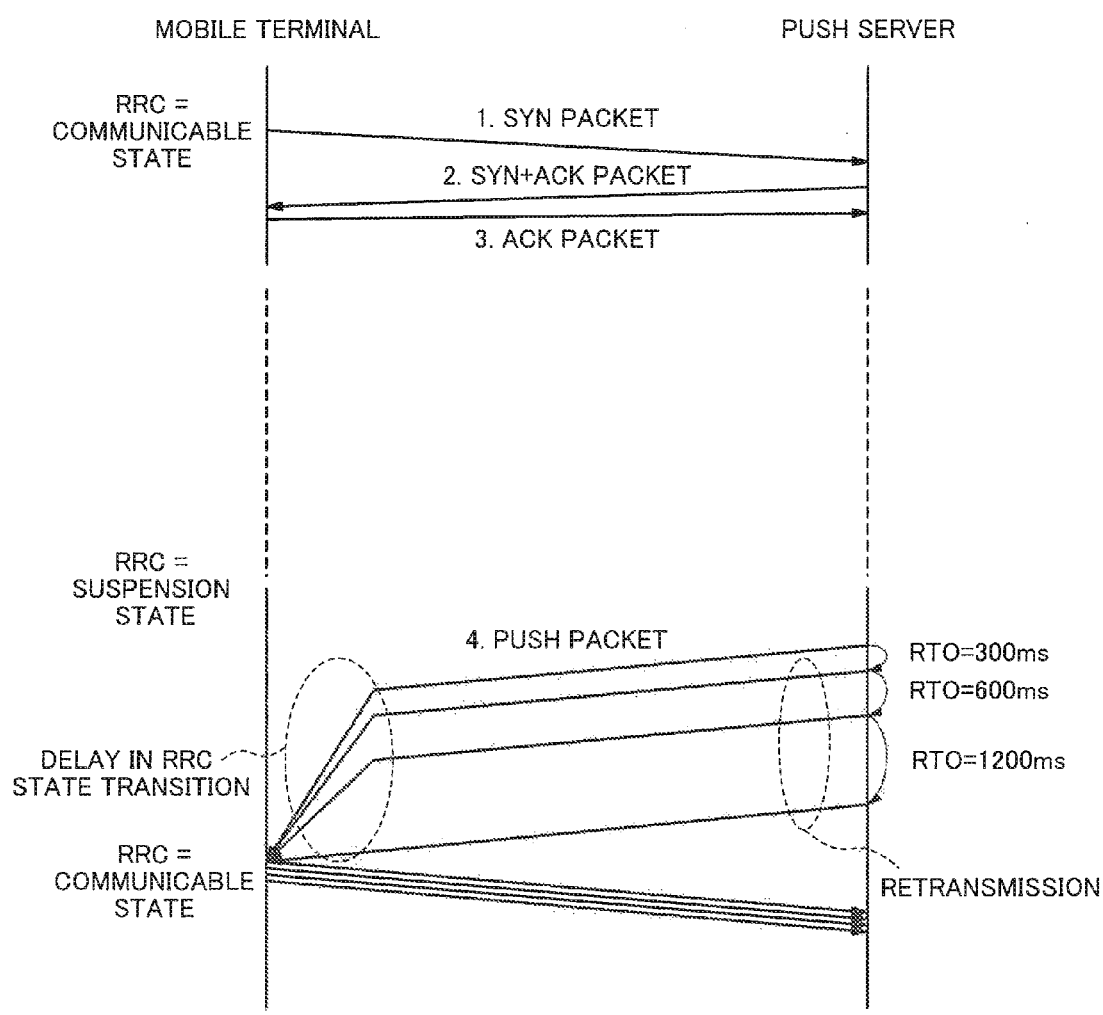
FIG. 2 is a diagram explaining a state in which a problem of carrying out retransmission is caused in the case of the keep alive method.
Figure 3:
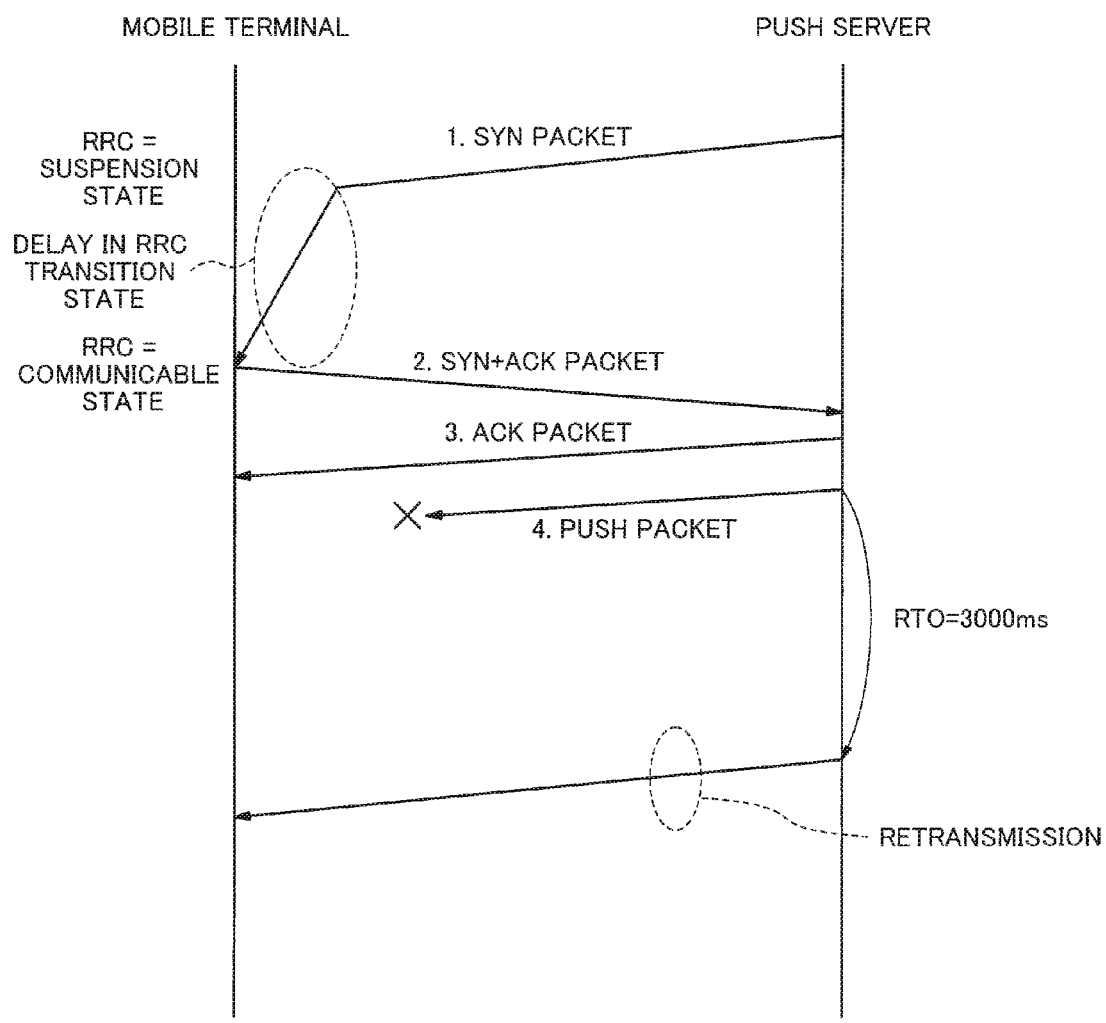
FIG. 3 is a diagram explaining a state in which a problem of carrying out retransmission is caused in the case of the direct connection method.
Figure 4:
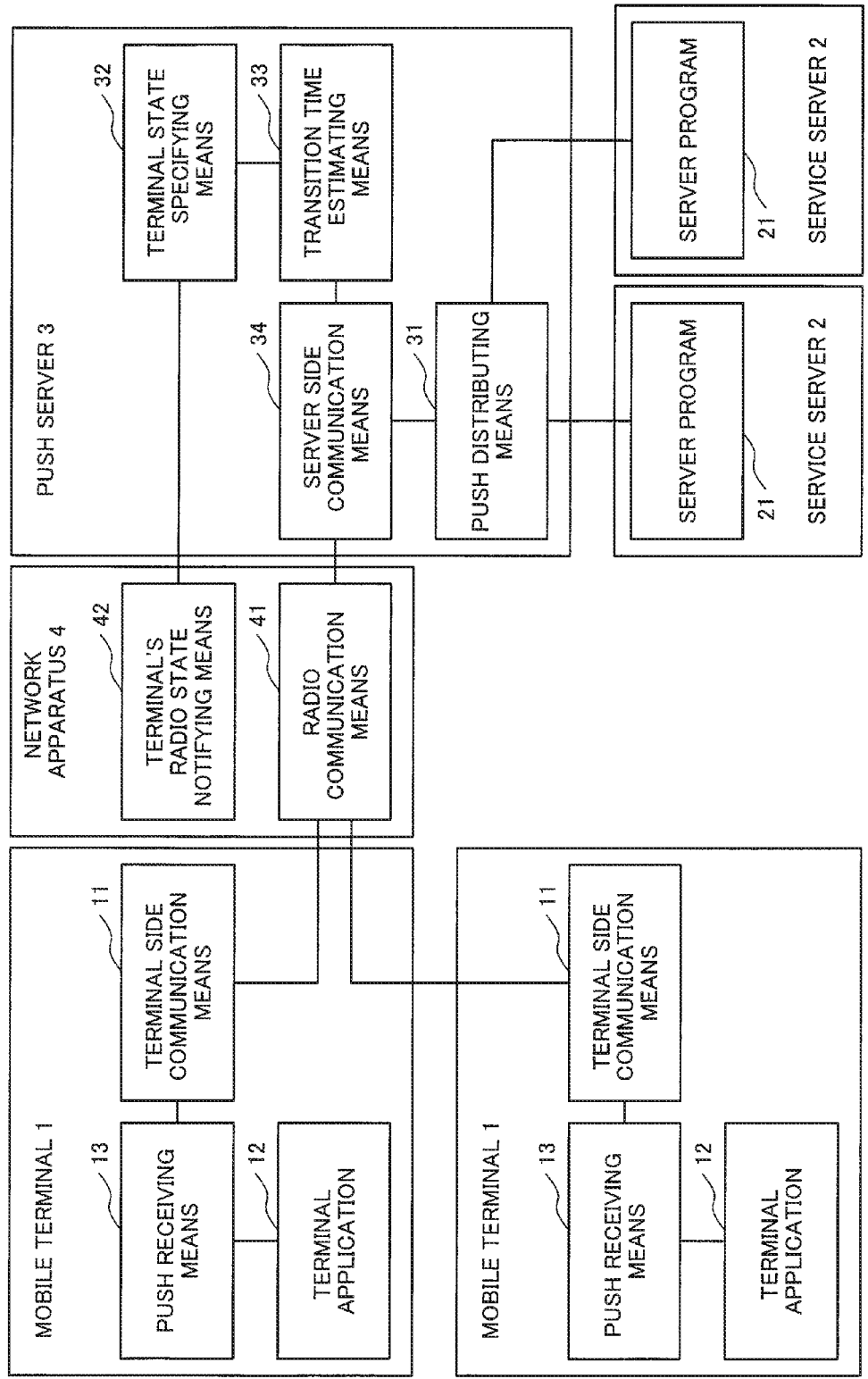
FIG. 4 is a block diagram showing a configuration of a message distributing system of an exemplary embodiment of the present invention.

Hereinafter, the message distributing apparatus and the message distributing system, which includes the message distributing apparatus, according to the present exemplary embodiment will be explained in further detail with reference to FIG. 4. FIG. 4 is a block diagram showing a configuration of the message distributing system of the present exemplary embodiment. The message distributing system of the present exemplary embodiment includes one or more mobile terminals 1 which a user handles, and a service server 2 which provides the user with a service in cooperation with the mobile terminal 1. Furthermore, the message distributing system includes a push server 3 which repeats distribution of a push message, that is provided by the service server 2, to the mobile terminal 1, and a network apparatus 4 which receives a request for distribution of the message from the push server 3 and transmits the push message to the mobile terminal 1 through a radio network. Here, the push server 3 is corresponding to the message distributing apparatus of the present exemplary embodiment.

The mobile terminal 1 includes a terminal side communication means 11 which carries out packet communication with the network apparatus 4 through the radio network, and establishes communication connection with the push server 3 to receive the push message. Furthermore, the mobile terminal 1 includes a terminal application 12 which provides a user with a service, and a push receiving means 13 which distributes the push message to the terminal application 12 designated by the push message received by the terminal side receiving means 11.

The service server 2 includes a server program 21 which provides the user with the service in cooperation with the terminal application 12 working on the mobile terminal 1.

The push server 3 includes a push distributing means 31 which, from the server program 21, receives a request for distribution of the push message to the mobile terminal 1, and specifies the mobile terminal 1 which is designated by the request for distribution, and processes distribution of the push message to the mobile terminal 1. Furthermore, the push server 3 includes a terminal state specifying means 32 which specifies a RRC state of the mobile terminal 1 in cooperation with the network apparatus 4. Furthermore, the push server 3 includes a transition time estimating means 33 which estimates a delay time in RRC state transition, that is caused in the case of communicating with the mobile terminal 1, on the basis of the RRC state of the mobile terminal 1 specified by the terminal state specifying means 32. Furthermore, the push server 3 includes a server side communication means 34 which sets a retransmission control time to the connection with the mobile terminal 1 on the basis of the transition delay time estimated by the transition time estimating means 33, and transmits the push message to the network apparatus 4 through the connection with the mobile terminal 1

The network apparatus 4 includes a radio communication means 41 which converts data communication with a server apparatus, that is connected with a wired network, into a radio network communication method and repeats data communication based on the radio network communication method to the mobile terminal 1. Furthermore, the network apparatus 4 includes a terminal's radio state notifying means 42 which notifies a communication state of the mobile terminal 1 in reply to a request for searching for the mobile terminal 1's communication state designated by the terminal state specifying means 32 of the push server 3.

Various terminal applications 12 and processes other than the connection activating sequence, which is based on the TCP/IP protocol, work on the mobile terminal 1. Each of the terminal applications 12 and the processes can communicate at any timing by use of the terminal side communication means 11. Moreover, also the network apparatus 4 connects with various servers and wired networks other than the push server 3, and can communicate with the mobile terminal 1 at any timing.

The terminal side communication means 11 of each mobile terminal 1 and the radio communication means 41 of the network apparatus 4 monitor radio communication of the mobile terminal 1 at a time other than the time of distributing the push message. Then, in the case that the mobile terminal does not communicate for a predetermined period of time, or in the case that the mobile terminal 1 notifies a desire to change the RRC state in order to reduce electric power consumption, it is possible to make the RRC state of the mobile terminal 1 transit to the suspension state. Moreover, in the case that the RRC state of the mobile terminal 1 is the suspension state at a time when the network apparatus 4 carries data communication with the mobile terminal 1, it is possible to make the RRC state of the mobile terminal 1 transit to the high speed communication state or the low speed communication state. The above-mentioned mechanism is described in NPL 1 and NPL 2, and details on the mechanism are omitted.

Figure 5:
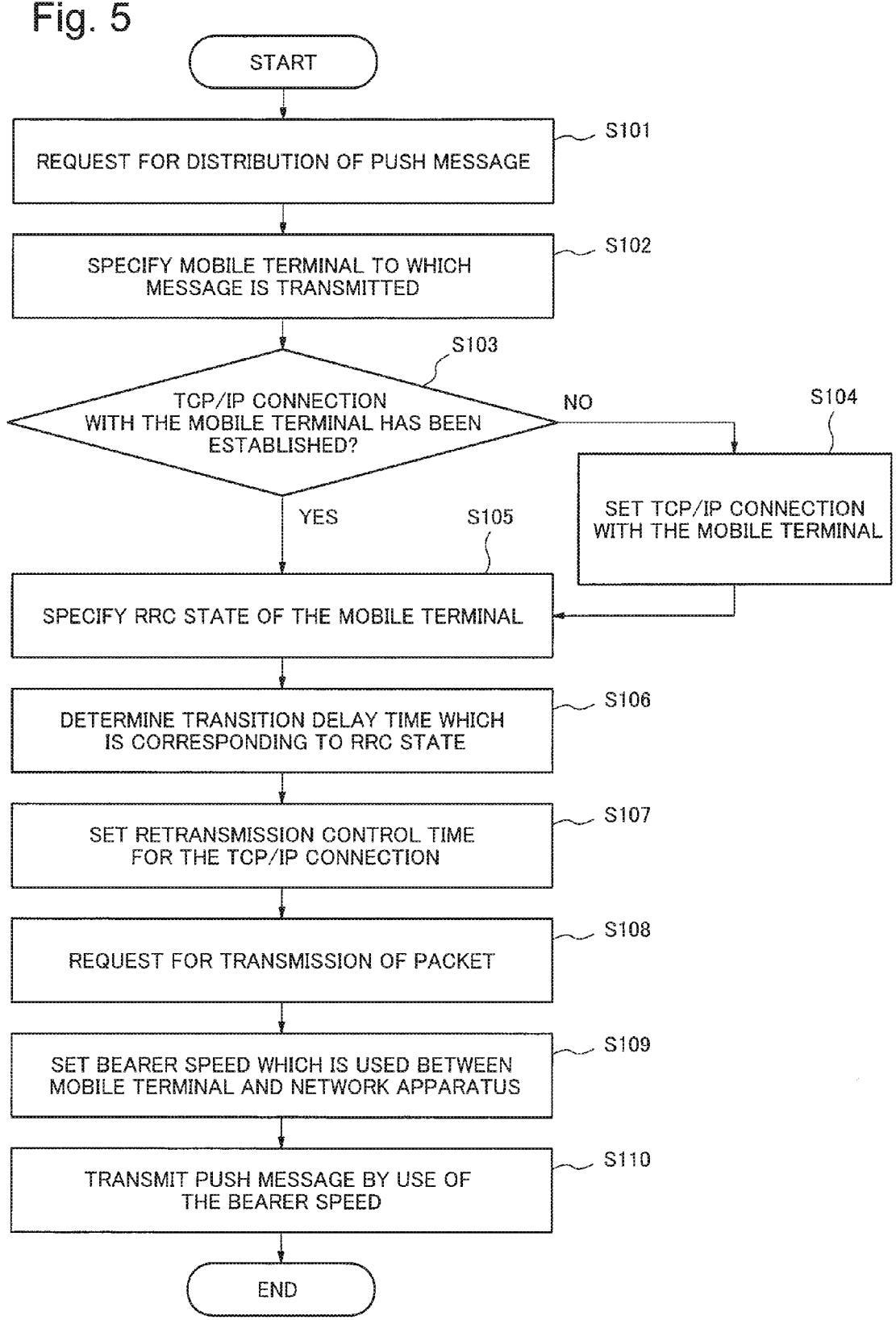
FIG. 5 is a flowchart showing a message distributing method of the message distributing system of the exemplary embodiment of the present invention.

Next, a message distributing method of the message distributing system of the present exemplary embodiment will be shown with reference to FIG. 4 and FIG. 5. Here, it is assumed in the following explanation that the connection between the mobile terminal 1 and the push server 3 is based on the TCP/IP protocol. However, any protocol other than the TCP/IP protocol is applicable to the present exemplary embodiment if the protocol carries out retransmission and controls the retransmission by use of a timer in the case that communication between the mobile terminal 1 and the push server 3 fails.

Firstly, the server program 21 transmits the request for distribution, which requests the push server 3 to distribute the push message to the specific mobile terminal 1, at any timing to the push server 3. The timing is determined according to contents of a service which is provided by the server program 21. For example, in the case that the server program 21 provides a chat service, at timing of notifying a user of receiving a chat message when the server program 21 receives the chat message which should be transmitted to the user, the message is distributed. Moreover, number of the mobile terminals 1, each of which is the distribution destination, may be one or more than one. Moreover, the mobile terminal 1 may be designated by use of any ID character string or by use of information, which is specified in the network, such as the IP address or the like.

Firstly, the push distributing means 31 of the push server 3 receives the request for distribution of the push message (Step S101). Next, the push distributing means 31 specifies the mobile terminal 1, to which the push message is distributed, on the basis of information on the mobile terminal 1 designated in the request for distribution (Step S102). After associating the mobile terminal 1 and the push message, the push server 3 transfers the association information to the server side communication means 34.

The server side communication means 34 checks whether the TCP/IP connection with the mobile terminal 1 has been already established (Step S103). In the case that the TCP/IP connection with the mobile terminal 1 is not established (No in Step S103), the TCP/IP connection with the mobile terminal 1 is activated (Step S104).

In the case that establishment of the TCP/IP connection with the mobile terminal 1 is confirmed (Yes in Step S103), or in the case that the connection is established in Step S104, the server side communication means 34 inquires of the transition time estimating means 33 a time which is necessary for transition of the RRC state of the mobile terminal 1. The transition time estimating means 33 inquires of the terminal state specifying means 32 the current RRC state of the mobile terminal 1 (Step S105).

The terminal state specifying means 32 inquires of the terminal's radio state notifying means 42 of the network apparatus 4, which manages the mobile terminal 1, the communication state of the mobile terminal 1. In the case that the terminal's radio state notifying means 42 always grasps the RRC state of the mobile terminal 1, the terminal's radio state notifying means 42 replies the RRC state to the terminal state specifying means 32. The terminal state specifying means 32 replies the RRC state of the mobile terminal 1 to the transition time estimating means 33 (Step S105).

In the case that the terminal's radio state notifying means 42 does not grasp the RRC state of the mobile terminal 1 and manages a time of communication with the mobile terminal 1 and a kind of the radio network through which the network apparatus 4 is connected with the mobile terminal 1, the terminal's radio state notifying means 42 replies the time of final communication with the mobile terminal 1 and the kind of the network, which is connected with the mobile terminal 1, to the terminal state specifying means 32. The terminal state specifying means 32 specifies the RRC state on the basis of the kind of the network, with which the mobile terminal 1 is connected, in comparison with the inactivity timer which is given in advance and which indicates a time until each RRC state transits. For example, it is assumed that a period of time which is necessary for the state of the mobile terminal 1, that is connected with a W-CDMA network, to transit from CELL_DCH to UTRA_Idle is 3 minutes. In the case that the kind of the network connected with the mobile terminal is W-CDMA, and only 10 seconds has passed since the final communication, the terminal state specifying means 32 judges that the RRC state of the mobile terminal 1 is CELL_DCH. Moreover, in the case that 3 minutes and 30 seconds has passed since the final communication of the mobile terminal 1, the terminal state specifying means 32 judges that the RRC state of the mobile terminal 1 is UTRA_Idle (Step S105).

The transition time estimating means 33 determines the transition delay time, which is corresponding to the specified RRC state, on the basis of a table which the transition time estimating means 33 manages (Step S106). An example of the table is shown in FIG. 6. FIG. 6 shows an example of the RRC state, and the transition delay time corresponding to the RRC state which are managed by the transition time estimating means 33. Since each of CELL_DH, CELL_FACH and RRC CONNECTED shown in FIG. 6 is the communicable state, the transition delay time in the radio state is not caused. But, in FIG. 6, the transition time estimating means 33 may designate an approximate value of the round trip time which is generated at a time of communicating in each radio state. FIG. 6 shows the mere example, and the transition time estimating means 33 may manage a plurality of tables each of which includes different states that are shown in a column of 'RRC state' of the table and that are defined according to the kinds of each radio network, each mobile terminal and each network apparatus. Moreover, a value of the transition delay time of each RRC state may not be a constant value, and may be updated dynamically on the basis of an actual communication time.

Next, the server side communication means 34 sets a new retransmission control time, which is used for activating the TCP/IP connection with the terminal 1, on the basis of the transition delay time which is provided by the transition time estimating means 33 (Step S107). While the retransmission control time can be calculated according to the above-mentioned Formula 3, another formula may be applicable.

For example, in the case that the radio state of the mobile terminal is UTRA_Idle shown in FIG. 6, the transition delay time is 3 seconds according to FIG. 6. On the assumption that SRTT is 3 seconds which is the transition delay time, and RTTVAR is the average variation of the round trip time at a time of UTRA_Idle (assumed to be 0.5), it is found from Formula 3 that RTO is 3+4×0.5=5. That is, the retransmission control time is 5 seconds.

Through the TCP/IP connection whose retransmission control time is set, the server side communication means 34 requests the network apparatus 4 to transmit the packet to the mobile terminal 1 (Step S108).

When the radio communication means 41 of the network apparatus 4 is requested to transmit the packet to the mobile terminal 1, the radio communication means 41 sets a communication bearer speed which is used by the radio communication means 41, and the terminal side communication means 11 of the mobile terminal 1 (Step S109). In the case that the RRC state of the mobile terminal is the suspension state at this time, it takes a time for the state of the mobile terminal 1 to transit to the communicable state as mentioned above. As a result, it takes a time for the radio communication means 41 to set the communication bearer speed.

When the communication bearer speed is set, the server side communication means 34 of the push server 3 transmits the push message to the radio communication means 41 of the network apparatus 4. Then, the network apparatus 4 transmits the push message to the terminal side communication means 11 of the mobile terminal 1 at the set communication bearer speed (Step S110).

The terminal side communication means 11 transfers the push message to the push receiving means 13. The push receiving means 13 determines the terminal application 12 which is a final distribution destination described in the push message, and transfers the message to the terminal application 12. The terminal application 12 reads contents of the push message, and provides the user with the corresponding service.

As mentioned above, the message distributing system of the present exemplary embodiment includes the mobile terminal and the service server which distributes the message to the mobile terminal. Furthermore, the message distributing system includes the message distributing apparatus which repeats the message and the request for distribution of the message that are provided by the service server, and the network apparatus which transmits the message, that is provided by the message distributing apparatus, to the mobile terminal. Furthermore, the message distributing apparatus sets the retransmission control time, which is used for controlling the time of retransmission of the message, on the basis of the request for distribution, and controls the time of retransmission to the network apparatus on the basis of the retransmission control time.

Moreover, the message distributing apparatus of the present exemplary embodiment includes the terminal state specifying means which specifies the RRC state, that indicates whether it is possible to communicate with the mobile terminal, on the basis of the request for distribution of the message to the mobile terminal. Furthermore, the message distributing apparatus includes the transition time estimating means which estimates the transition delay time, that is caused in the case of carrying out communication with the mobile terminal, on the basis of the RRC state. Furthermore, the message distributing apparatus includes the server side communication means which sets the retransmission control time, that is used for controlling the time of retransmission of the message, on the basis of the transition delay time, and controls the time of retransmission on the basis of the retransmission control time.

Moreover, the message distributing method of the present exemplary embodiment includes specifying the RRC state, which indicates whether it is possible to communicate with the mobile terminal, on the basis of the request for distribution of the message to the mobile terminal. Furthermore, the message distributing method includes estimating the transition delay time, which is caused in the case of carrying out communication with the mobile terminal, on the basis of the RRC state. Furthermore, the message distributing method includes setting the retransmission control time, which is used for controlling the time of retransmission of the message, on the basis of the transition delay time, and controlling the time of retransmission on the basis of the retransmission control time.

The message distributing program of the present exemplary embodiment makes a computer execute the process of specifying the RRC state, which indicates whether it is possible to communicate with the mobile terminal, on the basis of the request for distribution of the message to the mobile terminal. Furthermore, the message distributing program makes the computer execute the process of estimating the transition delay time, which is caused in the case of carrying out communication with the mobile terminal, on the basis of the RRC state. Furthermore, the message distributing program makes the computer execute the process of setting the retransmission control time, which is used for controlling the time of retransmission of the message, on the basis of the transition delay time, and controlling the time of retransmission on the basis of the retransmission control time.

The present exemplary embodiment brings about the following effects at the time of activating the connection on the basis of the protocol, which carries out the retransmission control, such as TCP/IP. As a first effect, in the case that the mobile terminal, whose RRC state is the communicable state, activates the connection with the push server, it is possible to suppress the useless retransmission of packet which is caused when the push server transmits the push message to the mobile terminal after elapse of the time. As a second effect, in the case that the push server activates the connection with the mobile terminal whose RRC state is the suspension state, it is possible to reduce the communication delay which is caused when the push server transmits the push message to the mobile terminal and the push message is lost.

That is, according to the present exemplary embodiment, it is possible to solve the problem that, when distributing the push message to the mobile terminal, the push server transmits the retransmission packet while the packet is not lost and consequently makes the network load heavy, and the problem that the push server does not transmit the retransmission packet while the packet is lost and consequently makes the arrival of the push message delayed.

It is apparent that the present invention is not limited to the above-mentioned exemplary embodiments, and various modifications can be made within the scope of the present invention which is described in Claims, and each modification is included in the present invention.

Moreover, a part of or all of the above-mentioned exemplary embodiment can be described like the following Supplementary note, but the exemplary embodiment is not limited to the following Supplementary note.

(Supplementary Note 1)

A message distributing system, comprising:

a mobile terminal;

a service server which distributes a message to the mobile terminal;

a message distributing apparatus which repeats the message and a request for distribution of the message that are provided by the service server; and a network apparatus which transmits the message, that is provided by the message distributing apparatus, to the mobile terminal, wherein the message distributing apparatus sets a retransmission control time, which is used for controlling a time of retransmission of the message, on the basis of the request for distribution, and controls the time of retransmission to the network apparatus on the basis of the retransmission control time.

(Supplementary Note 2)

The message distributing system according to Supplementary note 1, wherein the message distributing apparatus specifies a RRC state, which indicates whether it is possible to communicate with the mobile terminal, on the basis of the request for distribution, and estimates a transition delay time, which is caused in the case of carrying out communication with the mobile terminal, on the basis of the RRC state, and sets the retransmission control time on the basis of the transition delay time.

(Supplementary Note 3)

The message distributing system according to Supplementary note 2, wherein the message distributing apparatus, comprising:

a terminal state specifying means which specifies the RRC state on the basis of the request for distribution;

a transition time estimating means which estimates the transition delay time on the basis of the RRC state; and a server side communication means which sets the retransmission control time on the basis of the transition delay time, and controls the time of retransmission to the network apparatus on the basis of the retransmission control time.

(Supplementary Note 4)

The message distributing system according to Supplementary note 3, wherein the terminal state specifying means specifies the RRC state by acquiring the RRC state or by estimating the RRC state on the basis of past communication records.

(Supplementary Note 5)

A message distributing apparatus, comprising:

a terminal state specifying means which specifies a RRC state, that indicates whether it is possible to communicate with a mobile terminal, on the basis of a request for distribution of a message to the mobile terminal;

a transition time estimating means which estimates a transition delay time, that is caused in the case of carrying out communication with the mobile terminal, on the basis of the RRC state; and a server side communication means which sets a retransmission control time, that is used for controlling a time of retransmission of the message, on the basis of the transition delay time, and controls the time of retransmission of the message on the basis of the retransmission control time.

(Supplementary Note 6)

The message distributing apparatus according to Supplementary note 5, wherein the terminal state specifying means specifies the RRC state by acquiring the RRC state or by estimating the RRC state on the basis of past communication records.

(Supplementary Note 7)

The message distributing apparatus according to Supplementary notes 5 or 6, wherein the server side communication means inquires of the transition time estimating means the transition delay time on the basis of the request for distribution, wherein the transition time estimating means inquires of the terminal state specifying means the RRC state, wherein the terminal state specifying means inquires of a network apparatus, which manages the mobile terminal, the RRC state, and specifies the RRC state by acquiring the RRC state from the network apparatus in the case that the network apparatus grasps the RRC state, and replies the RRC state to the transition time estimating means, wherein the transition time estimating means determines the transition delay time on the basis of the RRC state and a correspondence table which is managed by the transition time estimating means and which indicates a correspondence between the RRC state and the transition delay time, and wherein the server side communication means sets the retransmission control time on the basis of the transition delay time, and controls the time of retransmission of the message to the network apparatus on the basis of the retransmission control time.

(Supplementary Note 8)

The message distributing apparatus according to Supplementary note 7, wherein in the case that the network apparatus manages a time of communication with the mobile terminal, and a kind of network through which the network apparatus is connected with the mobile terminal, the terminal state specifying means acquires the final communication time and the kind of network, and specifies the RRC state by estimating the RRC state on the basis of the final communication time, the kind of network and a predetermined time until transition of the RRC state is completed.

(Supplementary Note 9)

The message distributing apparatus according to Supplementary note 7 or 8, wherein number of the correspondence tables is more than one.

(Supplementary Note 10)

The message distributing apparatus according to any one of Supplementary notes 7 to 9, wherein the correspondence table is updated one after another.

(Supplementary Note 11)

A message distributing method, comprising:

specifying a RRC state, which indicates whether it is possible to communicate with a mobile terminal, on the basis of a request for distribution of a message to the mobile terminal;

estimating a transition delay time, which is caused in the case of carrying out communication with the mobile terminal, on the basis of the RRC state;

setting a retransmission control time, which is used for controlling a time of retransmission of the message, on the basis of the transition delay time; and controlling the time of retransmission on the basis of the retransmission control time.

(Supplementary Note 12)

The message distributing method according to Supplementary note 11, wherein the RRC state is specified by acquiring the RRC state or by estimating the RRC state on the basis of past communication records.

(Supplementary Note 13)

A message distributing program makes a computer execute:

a process of specifying a RRC state, which indicates whether it is possible to communicate with a mobile terminal, on the basis of a request for distribution of a message to the mobile terminal;

a process of estimating a transition delay time, which is caused in the case of carrying out communication with the mobile terminal, on the basis of the RRC state; and a process of setting a retransmission control time, which is used for controlling a time of retransmission of the message, on the basis of the transition delay time, and controlling the time of retransmission of the message on the basis of the retransmission control time.

(Supplementary Note 14)

The message distributing program according to Supplementary note 13, wherein in the process of specifying the RRC state, the RRC state is specified by acquiring the RRC state or by estimating the RRC state on the basis of past communication records.

This application is based upon and claims the benefit of priority from Japanese Patent Application No. 2013-144817, filed on Jul. 10, 2013, the disclosure of which is incorporated herein in its entirety by reference.

INDUSTRIAL APPLICABILITY

The present invention can be applied to push communication which has composition that a message distributing apparatus transmits a push message to a mobile terminal.

REFERENCE SIGNS LIST 1 and 10 mobile terminal
2 and 20 service server
3 push server
4 and 40 network apparatus
11 terminal side communication means
12 terminal application
13 push receiving means
21 server program
30 message distributing apparatus 31 push distributing means
32 terminal state specifying means
33 transition time estimating means
34 server side communication means
41 radio communication means
42 terminal's radio state notifying means
100 message distributing system

What is claimed is:

1. A message distributing system, comprising:
a mobile terminal;
a service server which distributes a message to the mobile terminal;
a message distributing apparatus which repeats the message that is provided by the service server; and
a network apparatus which transmits the message, that is provided by the message distributing apparatus, to the mobile terminal, wherein
the message distributing apparatus sets a retransmission control time, which is used for controlling a time of retransmission of the message, on the basis of a request for distribution, which is provided by the service server and specifies the mobile terminal, and controls the time of retransmission to the network apparatus on the basis of the retransmission control time,
wherein the message distributing apparatus specifies a RRC (Radio Resource Control) state of the mobile terminal, which indicates whether it is possible to communicate with the mobile terminal, on the basis of the request for distribution, and estimates a transition delay time from one RRC state to another RRC state, which is caused in the case of carrying out communication in the mobile terminal, on the basis of the RRC state, and sets the retransmission control time on the basis of the transition delay time.

2. The message distributing system according to claim 1, wherein
the message distributing apparatus, further comprises:
at least one processor configured to implement:
a terminal state specifier which specifies the RRC state on the basis of the request for distribution;
a transition time estimator which estimates the transition delay time on the basis of the RRC state; and
a server side communication controller which sets the retransmission control time on the basis of the transition delay time, and controls the time of retransmission to the network apparatus on the basis of the retransmission control time.

3. The message distributing system according to claim 2, wherein
the terminal state specifier specifies the RRC state by acquiring the RRC state or by estimating the RRC state on the basis of past communication records.

4. A message distributing apparatus, comprising:
at least one processor configured to implement:
a terminal state specifier which specifies a RRC (Radio Resource Control) state of a mobile terminal, that indicates whether it is possible to communicate with the mobile terminal, on the basis of a request for distribution of a message to the mobile terminal;
a transition time estimator which estimates a transition delay time from one RRC state to another RRC state, which is caused in the case of carrying out communication in the mobile terminal, on the basis of the RRC state; and
a server side communication controller which sets a retransmission control time, that is used for controlling a time of retransmission of the message, on the basis of the transition delay time, and controls the time of retransmission on the basis of the retransmission control time.

5. The message distributing apparatus according to claim 4, wherein
the terminal state specifier specifies the RRC state by acquiring the RRC state or by estimating the RRC state on the basis of past communication records.

6. The message distributing apparatus according to claim 4, wherein
the server side communication controller inquires of the transition time estimator the transition delay time on the basis of the request for distribution, wherein
the transition time estimator inquires of the terminal state specifying unit the RRC state, wherein
the terminal state specifier inquires of a network apparatus, which manages the mobile terminal, the RRC state, and specifies the RRC state by acquiring the RRC state from the network apparatus in the case that the network apparatus grasps the RRC state, and replies the RRC state to the transition time estimator, wherein
the transition time estimator determines the transition delay time on the basis of the RRC state and a correspondence table which is managed by the transition time estimator and which indicates a correspondence between the RRC state and the transition delay time, and wherein
the server side communication controller sets the retransmission control time on the basis of the transition delay time, and controls the time of retransmission of the message to the network apparatus on the basis of the retransmission control time.

7. The message distributing apparatus according to claim 6, wherein
in the case that the network apparatus manages a time of communication with the mobile terminal, and a kind of network through which the network apparatus is connected with the mobile terminal, the terminal state specifier acquires a final communication time and the kind of network, and specifies the RRC state by estimating the RRC state on the basis of the final communication time, the kind of network and a predetermined time until transition of the RRC state is completed.

8. The message distributing apparatus according to claim 6, wherein
there is more than one correspondence table.

9. The message distributing apparatus according to claim 6, wherein
the correspondence table is updated one after another.

10. A message distributing method, comprising:
specifying a RRC state of a mobile terminal, which indicates whether it is possible to communicate with the mobile terminal, on the basis of a request for distribution of a message to the mobile terminal;
estimating a transition delay time from one RRC state to another RRC state, which is caused in the case of carrying out communication in the mobile terminal, on the basis of the RRC state;
setting a retransmission control time, which is used for controlling a time of retransmission of the message, on the basis of the transition delay time; and
controlling the time of retransmission of the message on the basis of the retransmission control time.

11. The message distributing method according to claim 10, wherein the RRC state is specified by acquiring the RRC state or by estimating the RRC state on the basis of past communication records.

* * * * *